United States Patent [19]

Fox

[11] 4,418,784
[45] Dec. 6, 1983

[54] BICYCLE TRANSMISSION ASSEMBLY

[76] Inventor: Duke Fox, 5305 Towson Ave., Fort Smith, Ak. 72901

[21] Appl. No.: 342,820

[22] Filed: Jan. 26, 1982

[51] Int. Cl.³ ............................................. B62M 13/04
[52] U.S. Cl. ........................................ 180/221; 180/74
[58] Field of Search ................................. 180/74, 221

[56] References Cited

U.S. PATENT DOCUMENTS

| 1,517,338 | 12/1924 | Bessiere | 180/74 |
| 2,069,679 | 2/1937 | Petmecky | 180/221 |
| 2,328,233 | 8/1943 | Schunk | 180/221 |
| 2,954,836 | 10/1960 | Cavanaugh | 180/74 |
| 3,431,994 | 3/1969 | Wood | 180/221 |

FOREIGN PATENT DOCUMENTS

| 516049 | 8/1955 | Canada | 180/74 |
| 434470 | 4/1948 | Italy | 180/74 |

Primary Examiner—Joseph F. Peters, Jr.
Assistant Examiner—D. Lynn Fugate
Attorney, Agent, or Firm—Laff, Whitesel, Conte & Saret

[57] ABSTRACT

The invention provides a drive train system for a motor which can be bolted onto a conventional bicycle frame. The drive train has a pair of spaced parallel swing arms having two parts integrally joined at an apex and pivoting at the apex about the centerline of a crankshaft in the motor. The swing arms are fitted with an integral torque bar and an axle shaft, extending between the parallel swing arms. A relatively large diameter drive roller, with a special cleated surface geometry, is mounted on the axle shaft and driven from the motor shaft by way of gears, a chain or a belt. As the swing arms move in an arc, the center distances from the crankshaft to the axle shaft are always maintained constant. This enables the engine to be rigidly mounted in a symmetrical position over the bicycle wheel. A contact pressure between the cleated roller and the wheel is achieved by elongated coiled springs extending from the swing arms to a bicycle frame member. A clutching action overcomes the pull of the springs and swings the roller up and away from the tire.

15 Claims, 4 Drawing Figures

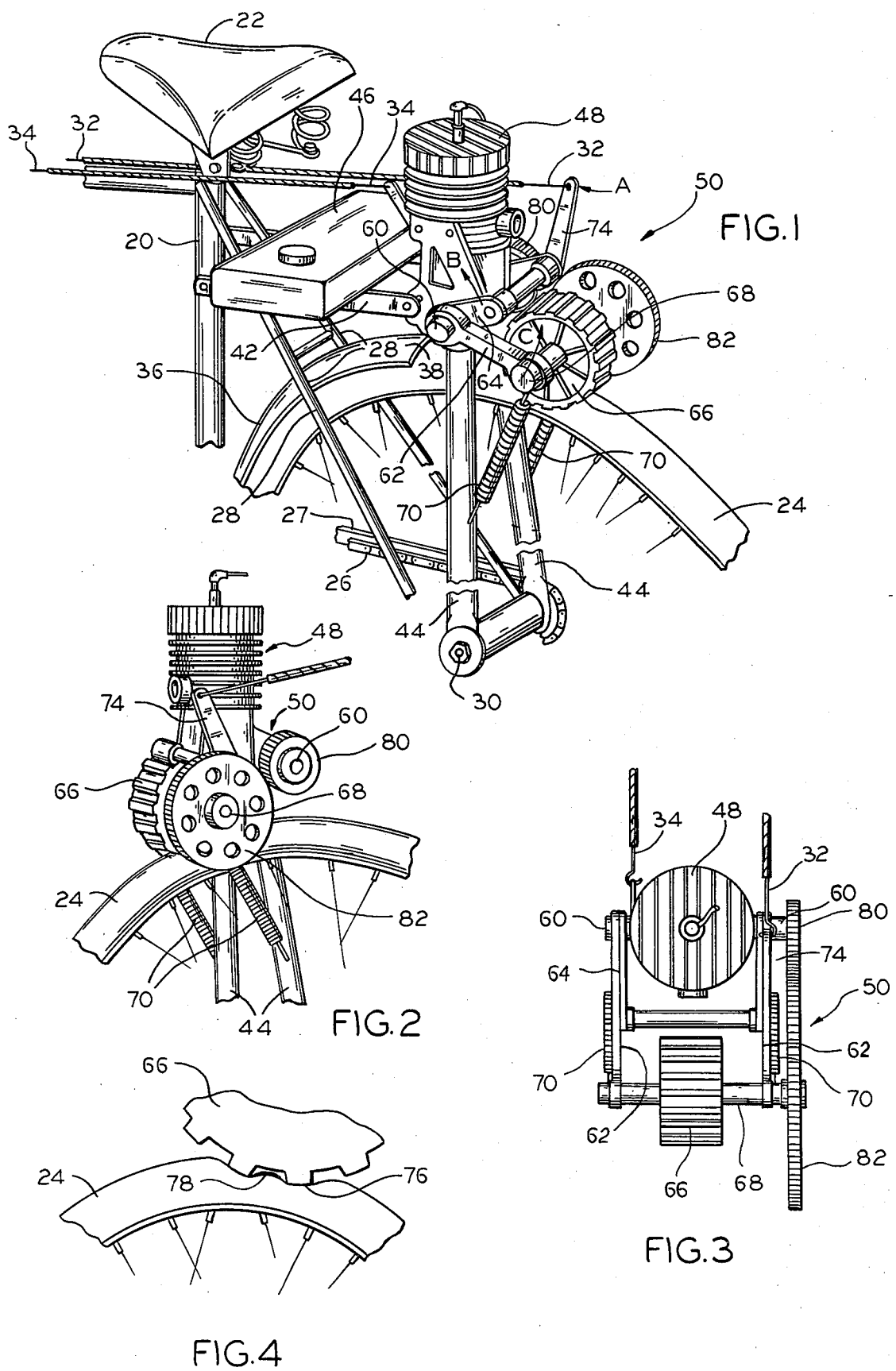

BICYCLE TRANSMISSION ASSEMBLY

This invention relates to drive trains and more particularly to drive trains for motorized bicycles.

The expression "motorized bicycle" is intended to refer to a two-wheeled, humanly powered vehicle which is "adapted" to be driven by a motor that is usually bolted or clamped thereon. That is, the frame, per se, of a "motorized bicycle" is the same basically humanly powered bicycle frame with nothing uniquely adapting it to motorization. The motor is mounted on the conventional bicycle frame by suitable brackets, support arms, and the like. This is distinguished from motorcycles, mo-peds or motor scooters, and the like, where the motor is supported by and contained within a special frame which is specifically adapted to receive and permanently mount the motor therein.

The motorcycles, mo-peds, etc., are designed to apply power to the wheels in a manner which does not cause premature and undue wear upon tires, bearings, and the like. However, motorized bicycles must customarily rely on friction between a roller on the motor crankshaft and the bicycle tire to transmit power. This arrangement usually results in a considerable power loss and in alignment problems resulting in a very high rate of tire wear More particularly, the motors of motorized bicycles are often mounted over either the front or the rear wheel. Usually, there is a spool or friction drive wheel which is mounted directly onto the crankshaft of the motor. This spool makes friction contact with and rolls on the tire tread, which means that the entire motor and drive spool, must be raised or lowered, as a unit, to apply or remove power. Since there is no speed reduction gearing, the spool has to be small in such an arrangement in order to enable it to run directly off the driveshaft and to swing the motor-drive spool unit back and forth to clutch the application of motor power to the wheel. The mount must be non-symmetrical when the drive spool is mounted directly on the crankshaft, which means that there is a torsional strain on the mount and non-symetrical wear on the pivot points of the motor mount. As such wear occurs, the misalignments increase, and the wear due to misalignment soon becomes intolerable. As a result, the drive spool position shifts with time and there is undue wear on both the tire and the drive spool.

Moreover, the small spool diameter required to drive the bicycle tire directly off the drive shaft results in a very small area of contact between spool and wheel. This small area, requires greater spool to tire pressure in order to provide sufficient friction, which further accelerates tire to spool wear.

In greater detail, the roller principle of the bicycle motor to tire drive requires substantial roller pressure to provide enough friction to do much driving. In early experiments on this invention, smaller rollers were used in the neighborhood of one-inch diameter. Increasing this diameter and the size of the roller helped somewhat in reducing the power loss due to rolling friction, but it did not have much effect upon reducing the thirty to fifty pounds of roller pressure that is required in order to keep the roller to tire slippage within tolerable limits. It was found that the problem persisted although different materials were used to make the rollers, such as: steel, aluminum, rubber, urethane, brass and wood. Many surface treatments were also tried, such as knurling, cross-hatching, etching, etc. All of these and similar rollers and surface treatments required essentially the same roller pressure, in the neighborhood of fifty pounds, to generate the friction required to crank the motor and to transmit the power of the motor once the motor was running. This high roller pressure made the clutch operation by handle bar grip virtually impossible and contributed a great deal to tire wear. In general, it as an unsatisfactory power transmission method.

Accordingly, an object of the invention is to provide new and improved means for and methods of motorizing bicycles. In this connection, an object is to provide a safe and reliable drive train having general utility and yet being particularly well suited to use on motorized bicycles and the like. Here, an object is to provide a drive train and transmission arrangement which does not cause the uneven motor or tire wear, that leads to early failure. In particular, an object is to provide a completely symmetrical drive train mount which distributes wear in an even manner.

Another object of the invention is to provide a drive train having a relatively large drive spool which produces a large spool to tire contact area so that the spool to tire pressure may be greatly reduced, as compared to conventional arrangements. Here, an object is to provide a roller surface which reduces roller-to-tire pressure.

Still another object of the invention is to accomplish the above objects while providing a drive train of such a low cost that it is competitive with existing drive trains.

A further object of the invention is to provide a method of lifting a drive roller off the tire, to provide a de-clutching function without disturbing the rigidly mounted motor.

In keeping with an aspect of the invention, these and other objects are accomplished by a pair of spaced parallel swing arms mounted to swing about pivots which are co-axial with the bearings of a crankshaft. A drive roller is mounted between and supported by the swing arms to provide an evenly applied pressure across the tire tread. A gear train applies the power of a motor to the drive roller. This way, the diameter of the spool is no longer directly established by the desired RPM-MPH ratio and the diameter of the roller may be increased to a more desirable size. The roller is a cog wheel which has a specified cleat width to valley width in order to reduce the pressure by deforming the tire to cause it to bulge between the cleats and to form a surface which may be described as a somewhat "mating" cog wheel.

A preferred embodiment of the invention is seen in the attached drawing, wherein:

FIG. 1 is a perspective view of a motorized bicycle having the inventive motor and drive train mounted thereon;

FIG. 2 is a similar view of the opposite side of the motorized bicycle, with a flywheel removed to enable a better showing thereof;

FIG. 3 is a plan view of the pertinent motor drive train and mount; and

FIG. 4 shows how cleats or ribs on the drive spool are spaced to give a more positive traction against the tread of the tire.

The major portions of a motorized bicycle are seen in FIG. 1 which includes symbolic parts of a conventional bicycle: frame 20, seat 22, rear wheel 24, and bicycle chain 26 and chain guard 27. The seat 22 is supported by a fork 28 which is attached to the axle 30 of the rear wheel. The remainder, non-shown parts of the bicycle are completely conventional except for handlebar levers which pull or release control cables 32, 34 extending to the motor and drive train. Cable 32 is a clutch control and cable 34 is a throttle control. The clutch control lever is essentially the same as the handlebar levers conventionally used to control brakes or derailers. The handlebar throttle control is similar to that used on motorcycles. The rear fender 36 is here shown as cut off or otherwise formed to terminate at any convenient point 38.

The inventive motor mount comprises a pair of horizontal struts 42 attached to the rear fork or seat clamp, and a pair of vertical struts 44 which are attached to the rear axle 30. These four struts 42, 44 support and carry a fuel tank 46, motor 48 and drive train 50. The motor and fuel tank are symmetrically supported in a fixed position with respect to the bicycle tire 24 and do not have to move in order to clutch the roller. Therefore, the mounting struts may be made as massively as may be required to give rigid support.

The motor 48 has a rotating shaft (here a crankshaft) output which is centered at 60. Co-axially with respect to the crankshaft, a spaced parallel pair of swing arms having integral, acutely positioned members 62, 64 are mounted at their apex around pivot points 60 on opposite sides of the motor block. A relatively large diameter, cleated, friction wheel or roller 66 is mounted on an axle 68 carried by the outer ends of the swing arms. Each cleat, and the valley or space between each cleat, may have a width which is in the order of $\frac{1}{4}$-$\frac{3}{8}$ inch. The diameter of this roller 66 is not limited by the desired final drive ratio. Therefore, the roller 66 may be relatively large, in the order of $3\frac{1}{4}''$-$4\frac{1}{4}''$ in diameter, whereas prior art drive spools or rollers attached directly onto the crankshaft are usually $1\frac{1}{4}''$-$2''$ in diameter in order to gear the bicycle to a reasonable speed and not to overload the motor. This means that there is a much larger contact area and greater friction between the inventive roller 66 and the tire 24 so that excessive roller to tire pressure is not required. Hence, the mount for the motor may be completely rigid and well centered with respect to the wheel. This maintains a better balance on the bicycle and eliminates or greatly reduces uneven tire wear.

A pair of elongated tension springs 70 hold down the swing arm 62 to provide a smooth and positive clutching action.

Means are provided for clutching the drive train by lifting the roller off and then returning it under tension of springs 70 into contact with the tire. In greater detail, integrally formed on the end of the upper right arm 64 of the swing arm is a post 74 having the control cable 32 attached thereto. As the rider grips a handlebar lever, cable 32 is pulled in direction A (FIG. 1). Post 74 also moves in direction A, causing the upper end of swing arm 64 to rotate in direction B around the pivot point 60, which is co-axial with the motor crankshaft. The outer end of the swing arm 62 rotates in direction C, thereby raising the roller 66 out of engagement with the tire 24. When the handlebar lever grip is released, tension springs 70 pull the swing arm 62 (and integrally associated part 64) downardly and all of the parts move in directions which are opposite to those indicated by the arrows A–C.

As best seen in FIG. 4, when the tension of springs 70 is correct, the pressure of the roller 66 acts upon the tire 24 and causes a distortion of the tire between each cleat (as at 76), whereby a small bulge (as at 78) forms in the valley between each cleat.

The shape of the roller cog wheel and the need for eliminating excessively high roller pressure, is determined by the relationship between the cleat width, the valley width, and the flexibility of the tire carcass. The optimum power transmission occurs when there is the closest cleat spacing that causes the tire to bulge significantly between the cleats. If the cleat spacing is too close, no bulge forms on the tire and there is no improvement in the required high pressure. If the cleat spacing is too wide, there is a rough running roller with a loss in driving force due to a reduction of the number of cleats. The improvement results from maximizing the slope angle of the bulge.

For the average bicycle tire, the optimum spacing between the cleats is in the $\frac{1}{4}''$ to $\frac{3}{8}''$ range, and the cleat width should not be too much narrower or it adversely affects tire wear. A result of this use of a cleated roller is that there is an improved traction with the roller pressure reduced to less than about half that required for the same diameter smooth roller. Power loss to the roller and power train appears to be almost directly proportional to the roller pressure; hence, the inventive system with that works quite well, with a roller pressure in the fifteen to twenty pound range. This relatively low pressure would be impossible to accomplish, even with the same size roller, regardless of whether the roller surface is smooth, knurled, or a finely cleated roller.

The power of the motor 48 is transmitted through drive roller 66 to the tire 24 by way of a gear train comprising a first gear 80 (or other suitable rotary member) connected directly to the crankshaft of motor 48, and a second gear 82 (or other suitable rotary member) connected to rotate as a unit with the drive roller 66. Since the length of the swing arms maintains a fixed distance between the crankshaft 60 and the roller axle 68, the gears 81, 82 remain meshed during the clutching and declutching, regardless of how far the swing arms may or may not rotate in directions B and C (FIG. 1) (or the reverse direction). The ratio of these gears may be changed to accommodate the desired maximum speed and the power speed available from a given motor. Hence, the diameter of roller 66 no longer determines the gearing ratio, as it did in previous systems wherein the roller was mounted directly on the crankshaft, which inherently limited the drive spool diameter to about $1\frac{3}{4}''$ to $2''$.

The gear train 80, 82 may be replaced by any other suitable rotary members, such as sprocket wheels and a bicycle chain, pulley wheels and a drive belt, or the like.

Any suitable engine, may be used to provide the motive power to drive the gear train 50. One embodiment used a greatly enlarged version of a model airplane engine.

Thos who are skilled in the art will readily perceive how to modify the system. Therefore, the appended claims are to be construed to cover all equivalent structures which fall within the true scope and spirit of the invention.

I claim:
1. A power drive and clutch arrangement for a motorized two wheeled vehicle, said arrangement comprising a source of motive power comprising an internal combustion engine rigidly mounted on said vehicle, said engine being symetrically mounted over a driven one of said two wheels and having a rotating crank shaft out- put which is transversely positioned so that said crank shaft is generally parallel with an axis about which said driven one of said two wheels rotates, a pair of swing arm means mounted on said engine to pivot about a pair of points which are co-axial with respect to the opposite ends of said rotating crank shaft, axle means connected between said pair of swing arm means at points which are located a predetermined distance from said pivot points, friction roller drive means centrally mounted between said swing arms on said axle means, and drive means comprising a first rotary member mounted on and turning with said rotating crank shaft and a second rotary member turning as a unit with said friction roller drive means; said swing arms, and roller drive means being centrally located and symmetrically positioned over the circumferential center of said driven wheel.

2. The arrangement of claim 1 wherein each of said swing arm means comprises an integral pair of levers having a mutually acute angular relationship, with respect to each other, each of said swing arms having an apex bearing located at an individually associated one of said co-axial pivot points, said axle being located at ends of a corresponding one of said levers in each of said pairs.

3. The arrangement of claim 2 and means associated with an end of at least one of said levers for selectively pivoting said swing arms around said co-axial pivot points.

4. The arrangement of any one of the claims 1–3 and at least one spring means for normally biasing said swing arms means toward an operating and power applying position and away from a pivoted and non-power applying position, whereby said drive train may be clutched by pulling at least one of said levers against the bias of said spring or by releasing said one lever to be positioned by the bias of said spring.

5. The arrangement of claim 4 wherein said spring means is at least one elongated coiled spring stretched between said swing arm means and a point which is rigidly associated with a frame of said bicycle.

6. The arrangement of claim 4 wherein said roller drive means is a relatively large diameter cleated roller in frictional contact with a tire on said bicycle, said cleats having a generally flat, planar surface at the points of contact with said driven wheel.

7. The arrangement of claim 6 wherein the diameter of said roller is in the order of $3\frac{1}{4}''-4\frac{1}{4}''$ and the width of and the spacing between said cleats is in the order of $\frac{1}{4}''-\frac{3}{8}''$.

8. A drive train system for transferring power between an internal combustion engine attached to a bicycle frame and a driven wheel of said bicycle, said system comprising a pair of spaced parallel swing arms pivoting on the center line of an output crank shaft of said engine, the pair of swing arms being fitted with an integral torque bar and axle, a relatively large diameter frictional drive roller with a cleated surface centrally mounted on said axle and between the swing arms for frictional engagement with said driven wheel, each of said cleats having a generally flat and planar surface at the point of said engagement, and means for driving the roller from the output shaft via rotary means which does not vary as the swing arms and axle move in an arc about said center line, whereby the center distances between the output shaft and the axle are maintained constant.

9. The system of claim 8 wherein said large diameter frictional drive wheel has at least a three-inch diameter, and means for rigidly mounting said engine and said frictional drive wheel symmetrically over said bicycle wheel.

10. The system of claim 8 and spring means for maintaining a contact pressure between roller and driven wheel, and means for providing a clutching action by overcoming the pull of the spring means and swinging the roller up and away from the tire.

11. A crank shaft-to-tire drive system comprising power means for driving said crnak shaft for generating motive forces for driving a tire, cleated roller means resting on a surface of said tire with a pressure adequate to distort that surface of said tire to form a bulge on the surface of said tire which bulge rises into valleys between the cleats on said roller wherein said cleats are separated from each other by distances which substantially maximize the slope angle of said bulge, means for transferring the motive forces from said power means crank shaft to said roller means, and means for moving said cleated roller means over an arc centered on said crank shaft and into and out of engagement with said tire surface, whereby said motive forces are clutched and declutched.

12. The system of claim 11 wherein said cleats and valleys have substantially the same widths.

13. The system of any one of the claims 11–12 wherein said roller-to-tire pressure is in the range of fifteen to twenty pounds.

14. The system of any one of the claims 11–12 wherein the diameter of the roller means is in the range of $3\frac{1}{4}''-4\frac{1}{4}''$.

15. The system of any one of the claims 11–12 wherein the widths of the cleats and valleys are in the range of $\frac{1}{4}''-\frac{3}{8}''$.

* * * * *